(12) United States Patent
Nagele

(10) Patent No.: US 7,472,465 B2
(45) Date of Patent: Jan. 6, 2009

(54) DEVICE FOR MOUNTING SEAT COVERS

(75) Inventor: Klaus Nagele, Oberndorf (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 705 days.

(21) Appl. No.: 10/525,049

(22) PCT Filed: Jun. 17, 2003

(86) PCT No.: PCT/EP03/06362

§ 371 (c)(1),
(2), (4) Date: Feb. 18, 2005

(87) PCT Pub. No.: WO2004/018347

PCT Pub. Date: Mar. 4, 2004

(65) Prior Publication Data
US 2005/0273991 A1    Dec. 15, 2005

(30) Foreign Application Priority Data
Aug. 22, 2002   (DE) ................................ 102 38 400

(51) Int. Cl.
*B68G 7/00* (2006.01)
(52) U.S. Cl. .................. 29/91; 29/281.1; 29/281.5; 29/464; 29/714
(58) Field of Classification Search ................ 29/91, 29/91.1, 281.5, 281.1, 714, 464, 559; 269/37, 269/296
See application file for complete search history.

(56) References Cited

U.S. PATENT DOCUMENTS

| 1,215,618 | A | * | 2/1917 | Buser | 29/91 |
| 5,199,144 | A | * | 4/1993 | Abe et al. | 29/235 |
| 5,253,401 | A | * | 10/1993 | Coon et al. | 29/91 |
| 5,327,629 | A | * | 7/1994 | Coon et al. | 29/91 |
| 5,603,150 | A | * | 2/1997 | Assink et al. | 29/91.8 |
| 6,298,532 | B1 | * | 10/2001 | Walt, II | 29/91 |
| 6,434,806 | B1 | * | 8/2002 | Walt, II | 29/91.5 |
| 6,453,529 | B1 | * | 9/2002 | Bentschneider | 29/91.5 |
| 6,629,346 | B2 | * | 10/2003 | Tillner | 29/91 |
| 6,629,347 | B2 | * | 10/2003 | Bentschneider | 29/91.5 |
| 6,680,216 | B2 | * | 1/2004 | Kwasnick et al. | 438/57 |
| 7,111,373 | B2 | * | 9/2006 | Shimano et al. | 29/91.5 |
| 7,430,793 | B2 | * | 10/2008 | Hamilton et al. | 29/91 |
| 2002/0108222 | A1 | | 8/2002 | Tillner | |

FOREIGN PATENT DOCUMENTS

DE    22 59 440 A    6/1974
DE    198 08 995 C1    5/1999

\* cited by examiner

*Primary Examiner*—Essama Omgba
(74) *Attorney, Agent, or Firm*—Roylance, Abrams, Berdo & Goodman, L.L.P.

(57) ABSTRACT

A device for mounting any type of seat covers (10) on foam cushion parts (12) of a seat, more particularly a vehicle seat, uses gripping elements (14) which form actuation groups (16, 18, 20, 22, 24) receiving the profiled strips (26, 28, 30, 32, 34) arranged on the seat cover (10). The gripping elements pull the profiled strips (16, 18, 20, 22, 24) into channel-like recesses (44, 46, 48, 50, 52) in the foam cushion part (12) by a positioning device (42). The positioning device allows a relative movement between the foam cushion part (12) and the corresponding gripping element (14) to fix the seat cover (10) to the foam cushion part (12).

9 Claims, 6 Drawing Sheets

DEVICE FOR MOUNTING SEAT COVERS

FIELD OF THE INVENTION

The present invention relates to a device for mounting seat covers of any type on foam cushion components of a seat, a vehicle seat in particular.

BACKGROUND OF THE INVENTION

In making vehicle seats, including aircraft passenger seats with the more recent seat technology generation, the previously customary wire insertion and tensioning systems have been replaced by a section fastening system (see, for example, DE 198 08 995 C1). In this new generation of section fastening systems, individual section strips of cloth, leather, plastic materials, or the like are mounted so as to be joined to the seat cover by sew-on narrowing strips. The respective section strips are oriented along the sew-on narrowing strips of the seat covers with respect to their extent and their length. The associated foam upholstery components of a particular seat, which are to be covered, are formed of a conventional flexible foam material, such as polyurethane foam. The seat component, together with its foam cushion, has on its side facing the seat cover channel-like recesses into which the respective section strip may be introduced, by hand, for example, for a process of fastening the seat cover on the foam cushion component.

The section introduced in this manner has flank elements on the side edge. The flank elements extend under the end sides of the foam cushion component delimiting a channel-like central recess by which the section component may be introduced into the respective foam channel. One significant advantage of this section fastening systems is that in the case of worn out seat covers or foam cushion components, such components may be replaced by disengaging the section component mounted on the seat cover from the channel introduced into the foam cushion component. The section inserted may be produced cost effectively as an extruded section, so that the fastening solution may be applied cost effectively despite the manual assembly required.

SUMMARY OF THE INVENTION

An object of the present invention is to provide a device for mounting seat covers where the assembly steps can be performed at least in part automatically to obtain additional time and cost advantages.

The object is basically attained by a device having gripping elements clustered in actuation groups which serve to receive section strips mounted on the seat cover. The gripping elements pull the section strips into channel-like recesses in a foam cushion component by a positioning mechanism. The positioning mechanism permits relative movement between foam cushion component and the respective gripping element for the purpose of fastening the seat cover on the foam cushion component. The device permits essentially automatic operation of applying the respective section strip to the seat cover. The section strips, which are sewn on the lower side of the seat cover are accordingly introduced manually or automatically into the recesses in the gripping elements and fastened there. The gripping elements extend, in the fastening situation described, through recesses in the foam cushion component, which extend transversely relative to the respective channel-like guides for the section strip. As a result of relative movement of section strip and seat cover with respect to the channel-like recesses in the foam cushion component, the section strips are then fastened in the foam cushion component, the fastening process involved being fully automatic. As soon as a particular section strip has been introduced into the associated foam channel in the foam cushion component, positioning of the seat cover on the foam cushion component to define the edges may then be carried out manually or, optionally, fastening on the foam cushion component may be performed by other operating equipment. The covered foam cushion component thereby obtained is then released as a seat component from the device for subsequent use.

The device of the present invention may be specially adapted for special components of the seat involved, for example, for the headrest area, the backrest, the seat component itself, and, optionally, in the case of aircraft passenger seats, in the form of leg, foot, or calf rests.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
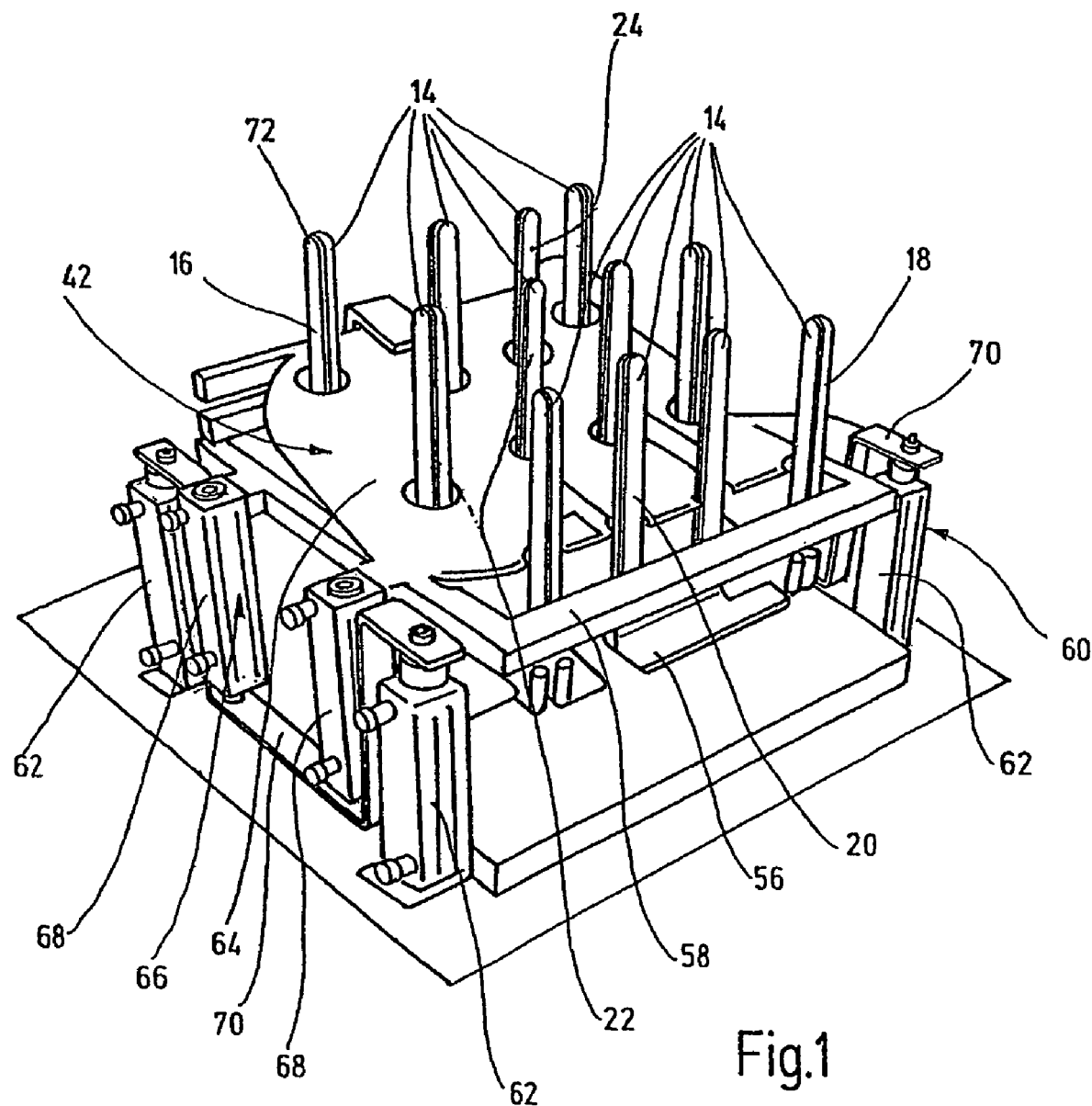
FIG. 1 is a diagrammatic, not-to-scale, perspective view of the device, according to one embodiment of the present invention in the initial state.

The device, according to an exemplary embodiment of the present invention, is shown in FIG. 1 in its initial state. The device is used for mounting seat covers of any type. A bottom view of a seat cover is shown in FIG. 6, as an example. Such seat covers 10, which may be of a cloth or leather material, or optionally of plastic, are to be fastened on foam cushion components 12 (see FIG. 5, for example) to obtain a seat component for a vehicle passenger seat or aircraft passenger seat. Seat components such as these may also be employed as treatment chairs, for example, in an operating area or the like.

The exemplary embodiment illustrated relates directly to the seat component of a motor vehicle seat. Other seat components may be comparably covered, for example, ones such as headrests, backrests, leg rests, etc. The device of the present invention has a plurality of gripping elements 14, twelve gripping elements 14 being used in the present case for covering a seat component. The twelve gripping elements 14 are clustered in five actuation groups 16, 18, 20, 22, and 24, and accordingly integrated. The respective gripping elements 14 are designed to receive section strips 26, 28, 30, 32, and 34, which are positioned on the seat cover (FIG. 6), it being possible to associate these section strips in the order indicated with the respective actuation groups of gripping elements 14. The section strips in question may be rigidly connected by sew-on narrowing strips 38 of conventional design to the lower side of the seat cover 10, and form in their longitudinal and transverse directions the corresponding seams 39, 40, on the upper side of the seat component (see FIG. 3).

Figure 4:
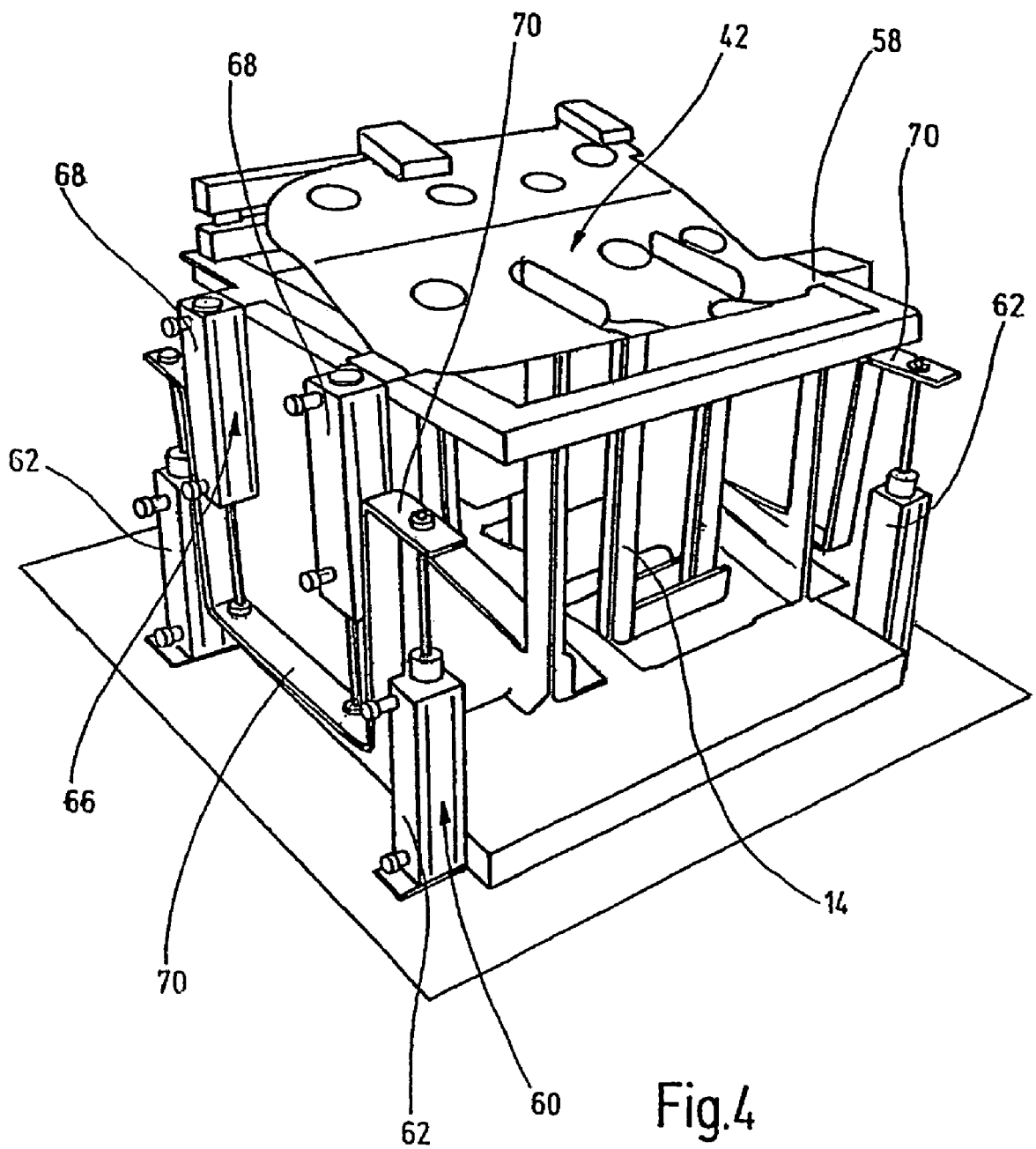
FIG. 4 is a perspective view of the device of FIG. 1 in the removal position of FIG. 3, with the covered seat component not shown.

The device also has a positioning mechanism 42, which, as is shown by comparison of FIGS. 1 and 4, permits relative movement between foam cushion component 12 and the gripping elements 14. The purpose of the automated device is to pull the individual section strips 26, 28, 30, 30, 34, into the associated channel-like recesses 44, 46, 48, 50, and 52 in the foam cushion component 12. In this way, the seat cover 10 may be reversibly or releasably fastened to the foam cushion component 12, that is, may be detached from the foam cushion component, as is to be discussed in greater detail in the following.

Figure 5:
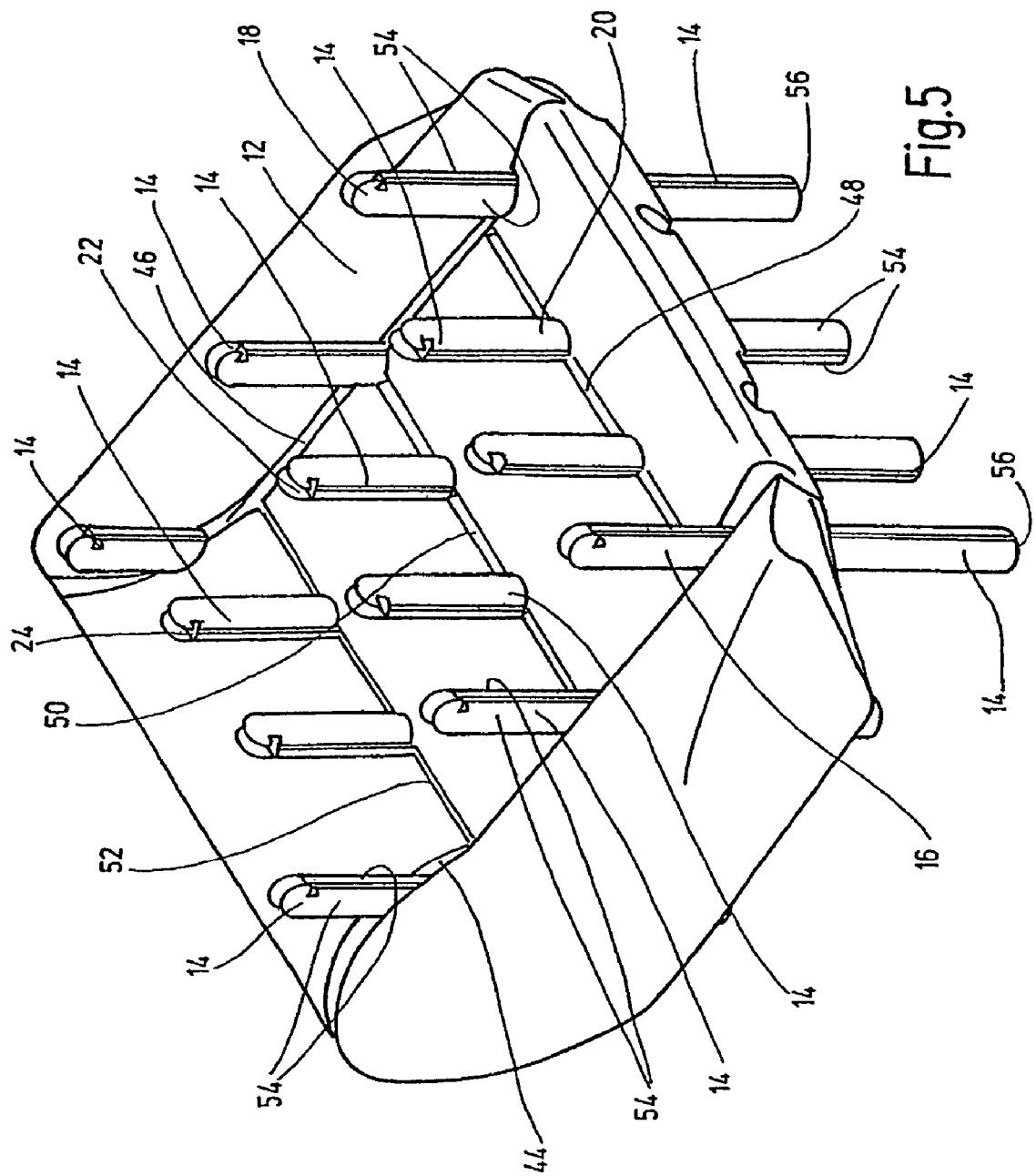
FIG. 5 is a perspective top view of a basic diagram illustrating a foam cushion component as seat component, together with the gripping elements of the device of FIG. 1 extending through the seat component.
Figure 6:
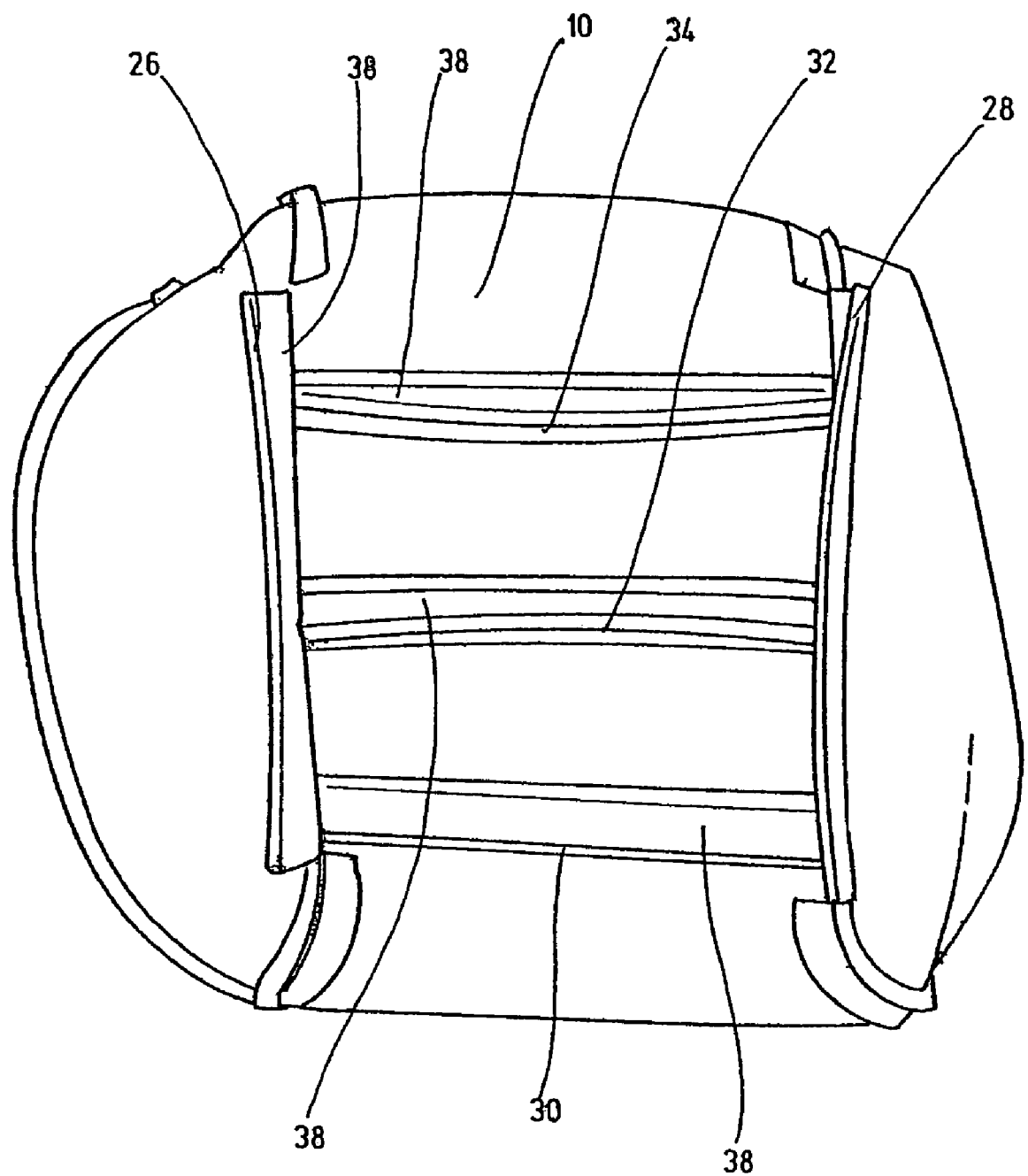
FIG. 6 is a bottom plan view of a seat cover with section strips extending longitudinally and transversely joined to the cover material by sew-on narrowing strips, according to one embodiment of the present invention.

As shown in particular by the diagram in FIG. 5, each gripping element 14 includes a gripping tong, with each gripping tong having two tong components 54 moveably relative to each other. The respective tong components 54 are formed by a longitudinal slot extending along the longitudinal axis of the rod-shaped gripping element 14. Gripping movement, that is a gripping process in which the gripping components are moved toward and detachably away from each other, is generated by a linear drive (not shown). The linear drive can be in the form of a pneumatic servomotor or a linear unit, for example, which makes the respective engagement movement possible. By preference, the linear drive grips the base component 56 (see FIG. 5) of each gripping element 14. A single drive is associated with each actuation group 16, 18, 20, 22, 24, so that the gripping or separation movement for the particular actuatable gripping element 14 is effected by only one drive for one actuation group collectively. Consequently, chronologically sequential actuation of the individual actuation groups may be performed by the respective, preferably pneumatic, drives (not shown).

Figure 3:
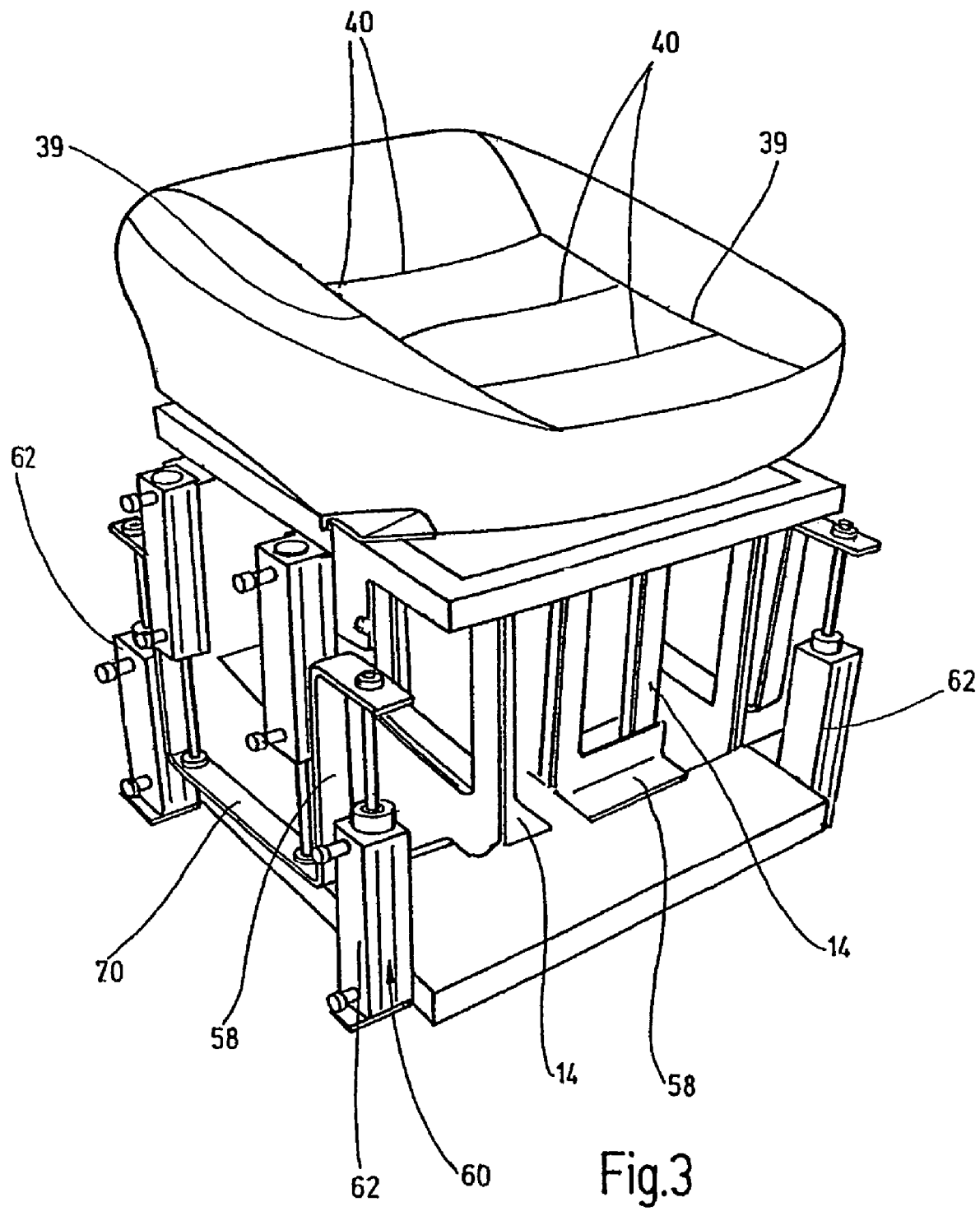
FIG. 3 is a perspective view of a removal position for a finished covered seat component of the device of FIG. 1.

As is also shown in FIGS. 1 and 3, all gripping elements 14 are mounted within a common frame component 58, which is vertically positionable by a first linear drive 60. The first linear drive has four operating cylinders 62 which, as is indicated in the figures, are mounted on the corners of the device, and accordingly enclose the gripping elements 14 together with the frame component 58 on the external circumference side. The frame component 58 encloses the gripping elements 14 on the external circumference side, and may be moved to a position relative to the vertically stationary gripping elements 14 by the first linear drive 60. It would also be possible to have embodiments in which the gripping elements 14 could be vertically adjusted in relation to the base of frame component 58 by a drive (not shown). In the present embodiment, however, the gripping elements 14 are mounted so as to be vertically stationary and permit the gripping movement only in a plane extending transversely to the vertical.

In addition to the frame component 58, the positioning mechanism 42 has a support component 64 for supporting the foam cushion component 12 along or on its lower side. The support component 64 has openings through which the gripping elements 14 extend when the support component 64 is in a lowered position (see FIG. 1, for example). In addition, the gripping elements 14 are clear of these openings when such openings are in a raised position (see FIG. 4). Another or second linear drive 66 with four operating cylinders 68, preferably powered by pneumatic means, performs the function of placing the support component 64 in the form of a planiform or plate-like support element in individual positions. The four operating cylinders 68 are mounted, grouped in pairs, facing each other on a U-shaped frame piece 70. The free ends of each U-shaped frame piece 70 are connected to the upper side of the four operating cylinders 62 of first linear drive 60, and are raised together with the four operating cylinders 68 of second linear drive 66 during their extension movement. This arrangement results in movement superimposed by first linear drive 60 on that of the second linear drive 66.

For a better understanding, an operating process, that is, seat covering or an assembly process with the device of the present invention is described.

The device of the present invention is initially in its base position as illustrated in FIG. 1. In this position, all gripping elements 14 are closed, that is, the gripping components 54 of each gripping element 14 are essentially adjacent to each other, and the head components 72 on the upper free ends of the gripping elements 14 also are not separated. In the base or initial position, the foam cushion component 12 in the form of a conventional seat component, which forms a sort of bucket seat, is positioned on the gripping elements 14. These gripping elements extend through channel-like recesses in the foam cushion component 12, which is oriented vertically, transversely to the channel-like recesses 44, 46, 48, 50, and 52, in the foam cushion component 12. The lower side of the foam cushion component 12 is positioned on the upper side of the planiform support component 64. By the pneumatic control unit, the gripping elements 14 are then actuated, for example, by a foot-hand switch or the like such that the tong components 54 of each gripping element 14 move apart for the head component 72 to reach a mounting position for each opened gripping element 14.

Figure 2:
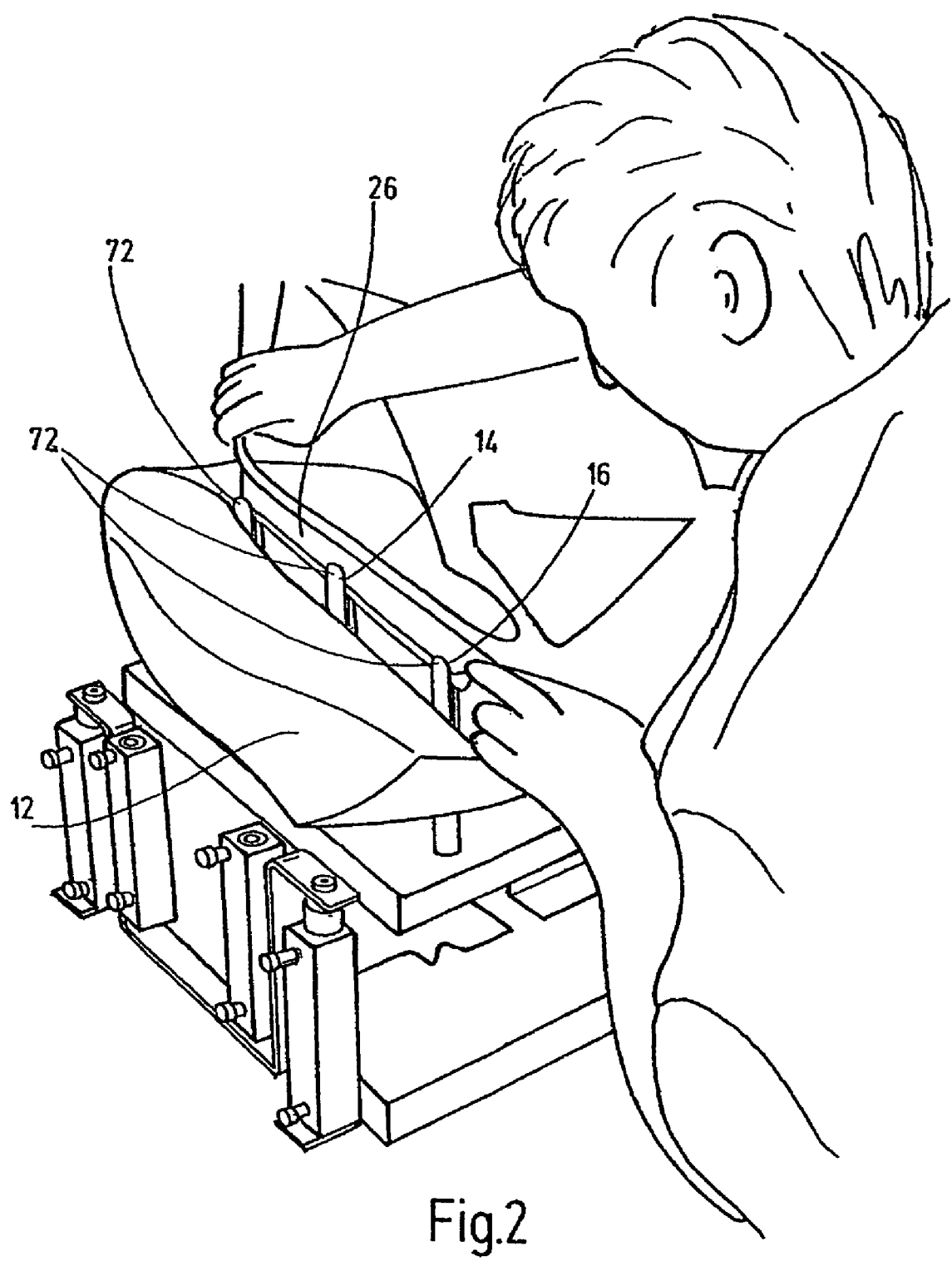
FIG. 2 is a perspective view of a process of introducing the section strip of a seat cover into the associated openings for the gripping elements of FIG. 1.

As is shown in FIG. 2, the first longitudinal section strip 26 may be introduced into the first actuation group 16 of gripping elements 14, either manually or by a handling system. The respective gripping elements 14 of the first actuation group 16 may then be closed. In a similar manner the other section strips 28, 30, 32, 34, are then introduced into the respective associated actuation groups 18, 20, 22, or 24, and the head components 72 move vertically to a corresponding axial distance from the associated channel-like recesses 44, 46, 48, 50, 52, in the foam cushion component 12. By preference, the process of introduction of the section strips takes place in the sequence 34, 32, 30, 26, 28. After the respective procedure of introduction has been completed, and provided that all gripping elements 14 are closed and enclose the respective section strips, the frame component 58 is raised together with the support component 64 by the first linear drive 60 with its four operating cylinders 62, as is shown in FIG. 3. The gripping elements 14, mounted to be stationary in the vertical direction, then pull the respective section strips 26, 28, 30, 32, 34, in the associated upward movement into the associated channels 44, 46, 48, 50, 52, in the foam cushion component 12. The section strips are then engaged in the associated channels.

In the respective installation situation, the edge components of the seat cover 10 are then pulled in over the associated cushion elements which surround the foam cushion component 12 on the edge. The covering process involved is completed as shown in FIG. 3. The gripping elements are then opened and, as is illustrated in FIG. 4, the second linear drive 66 is activated and the four other operating cylinders 68, acting on the U-shaped frame piece 70, move upward and in the process take at least the support component 64 upward with them. In the respective lifting movement, the covered seat component is moved farther upward. The head components 72 of the gripping elements 14 in the meantime have been moved to the release position, and are disengaged from the associated channels in the foam cushion component 12. The foam cushion component, supplemented by the support component 64, may be then removed by hand or by a handling unit. All gripping elements 14 are then closed again and the two linear drives 60, 66, are then brought in, so that the device moves to its initial position as shown in FIG. 1 for a new covering process. A repeated covering process may now begin.

While one embodiment has been chosen to illustrate the invention, it will be understood by those skilled in the art that various changes and modifications can be made therein without departing from the scope of the invention as defined in the appended claims.

What is claimed is:

1. A device for mounting a seat cover on a foam cushion component of a seat component, comprising:
   gripping elements arranged in actuation groups for receiving section strips mounted on a seat cover;
   a positioning mechanism having a support component for receiving a foam cushion component and being relatively movable relative to said gripping elements for moving the foam cushion part relative to said gripping elements and into channel shaped recesses in the foam cushion part to fasten the seat cover on the foam cushion part, said support component being movable between a lowered position in which said gripping elements extend through said support component and a raised position in which said support component is free of said gripping elements; and
   first and second linear drives coupled to and moving said support component into positions thereof, said second linear drive coupled to said first linear drive such that movement of said second linear drive is superimposed on movement of said first linear drive.

2. A device according to claim 1 wherein
   each of said gripping elements comprises a gripping tong having two tong components movable relative to one another between open and closed positions by a gripping drive.

3. A device according to claim 2 wherein
   said gripping drive comprises a spring mechanism.

4. A device according to claim 2 wherein
   each of said gripping elements comprises a rod having a head element with said tongs thereof on an upper end thereof for mounting a section strip of the seat cover and having a base component engaging a third linear drive permitting relative movement of said two tongs thereof toward one another.

5. A device according to claim 1 wherein
   said positioning mechanism comprises a common frame component enclosing all said gripping elements, said common frame being coupled to and movable by said first linear drive.

6. A device according to claim 5 wherein
   each of said first and second linear drives comprises four operating cylinders mounted on external circumferential sides of said positioning mechanism, said first linear drive engaging said common frame component, said second linear drive engaging said support component.

7. A device according to claim 6 wherein
   said operating cylinders of said second linear drive are displaceable vertically by said operating cylinders of said first linear drive.

8. A device according to claim 1 wherein
   twelve of said gripping elements are arranged in said actuation groups with each of two outmost longitudinal rows including three of said gripping elements to form said actuation groups for mounting section strips associated with two longitudinal seams of the seat component, and with each of three pairs of said gripping elements defining three actuation groups associated with three transverse seams on the seat component.

9. A device according to claim 1 wherein
   said first and second linear drives are pneumatically operated.

* * * * *